Patented Nov. 18, 1930

1,782,011

UNITED STATES PATENT OFFICE

ALBERT MUSHER, OF WASHINGTON, DISTRICT OF COLUMBIA

METHOD FOR PRESERVING EMULSIONS

No Drawing.   Application filed October 26, 1928.   Serial No. 315,349.

This invention relates to a method for preserving emulsions and particularly to the preservation of salad dressings such as mayonnaise in jars.

Normally, when mayonnaise is placed in a jar and the jar covered with a cap, a space remains between the surface of the mayonnaise and the inner surface of the cap, and as a practical proposition this space cannot be completely filled. As a result numerous disadvantages have occurred. First, in transit, the mayonnaise is shaken considerably and becomes thinner,—the emulsion thereby becoming weaker and, at times, completely separated.

Secondly, the air remaining in the space above the mayonnaise causes oxidation and discoloration of the upper surface of the mayonnaise which further results in rancidity. Obviously, this rancidity and discoloration gradually pervade the entire body of the emulsion.

Thirdly, this air also absorbs a certain amount of moisture from the surface of the mayonnaise thru evaporation. Since the substance that gives up this moisture is an emulsion, there is of course a certain amount of separation of the emulsion, and when droplets of oil thereby commence to gather they multiply by natural attraction and eventually cause complete separation of the emulsion.

Fourthly, the air space encourages surface mold growth and the action of bacteria, which in time pervade the emulsion.

Thus, the rancidity, oxidation and other disadvantages resulting from the known methods of shaking the mayonnaise or in any other way disturbing the emulsion eventually cause the mayonnaise to acquire such an odor and undesirable flavor as to render the mayonnaise unsalable. The desired fresh taste of a well preserved salad dressing is lost.

The object of this invention, therefore, is the preservation of emulsions and especially mayonnaise and similar salad dressings packed in jars or other containers by sealing the exposed surface of the emulsion or salad dressing in the containers or jars with the consequent elimination of the aforesaid disadvantages.

Another object of the invention is the filling of the space above or surrounding a packed emulsion and below the closure with a relatively inert material to prevent separation of the emulsion due to agitation during transit.

Further objects will appear from the remainder of the specification.

After the desired amount of emulsified salad dressing such as mayonnaise is placed in a jar, paraffin wax or any other suitable material of similar properties is poured over the surface of the mayonnaise until it reaches the upper level of the jar or as nearly so as is practicable, so that it may contact as nearly as possible with the inner surface of the closure when the latter is in place on the jar.

Since the wax fills all the irregularities in the surface of the salad dressing on one side and contacts the inner surface of the closure on the other side, it not only seals the surface of the emulsion from the air to prevent evaporation and oxidation but as soon as it hardens, it also serves as a press or stabilizer that prevents agitation thereof under such conditions as transit or shaking, which further results especially in preventing a weakening or breaking of the emulsion.

It is realized that wax has been placed over packaged jellies to prevent mold growth, but the advantages resulting from the use of wax in packaging mayonnaise are unknown to manufacturers of such salad dressings and in so far as I am aware it has never been heretofore so used.

I claim as my invention:

1. A method of stabilizing packaged emulsified food products of the salad dressing type comprising substantially filling the remaining space between the surface of the food product and the closure with relatively inert material having relatively the same properties as wax.

2. A structure of the character described comprising a receptacle, a closure for said receptacle, an emulsified salad dressing within the receptacle and spaced from the inner surface of the closure, and a stabilizing material of relatively inert material having relatively the same properties as wax substantially filling the said space.

ALBERT MUSHER.